Oct. 9, 1962   R. A. WATERS ETAL   3,057,194
TORQUE GAUGE
Original Filed Feb. 6, 1957   2 Sheets-Sheet 1
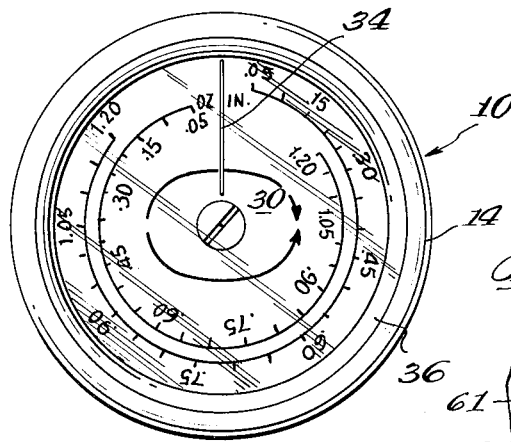
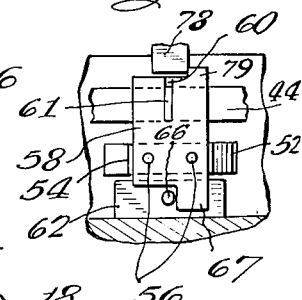
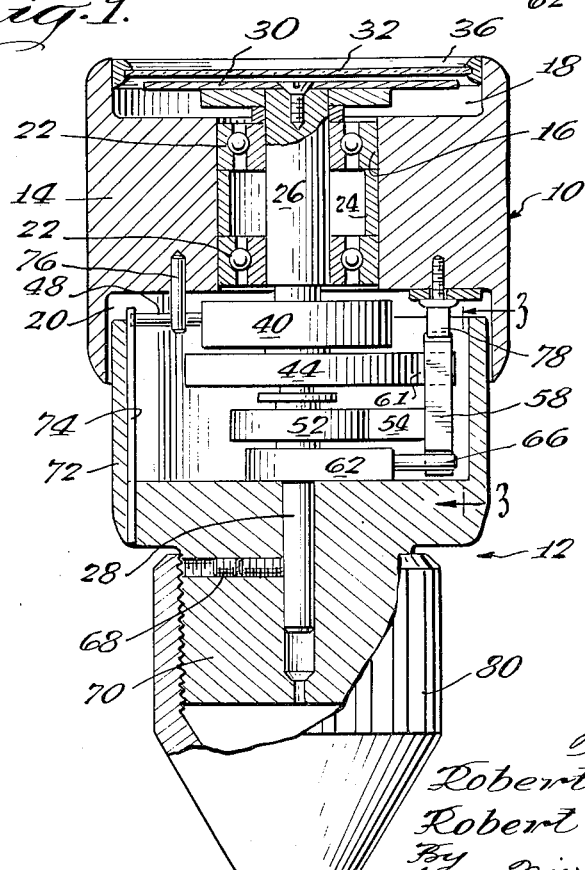

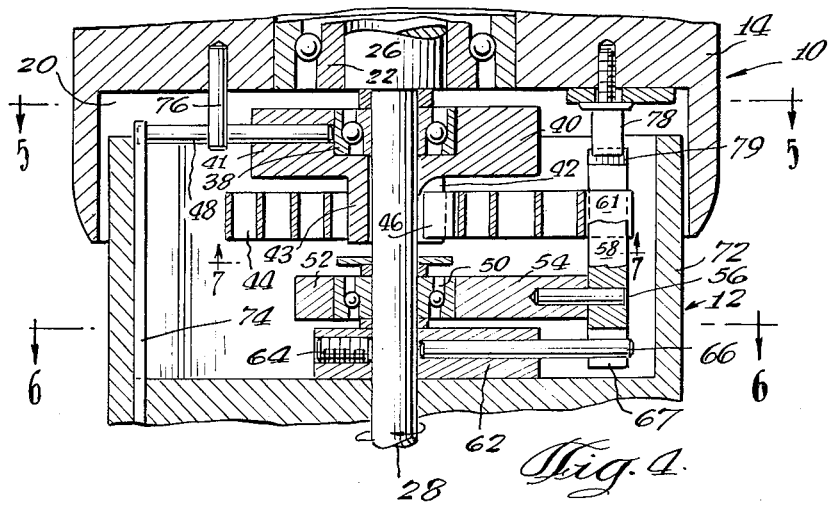
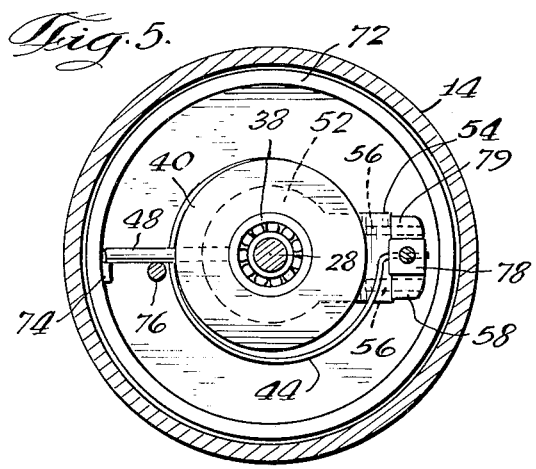
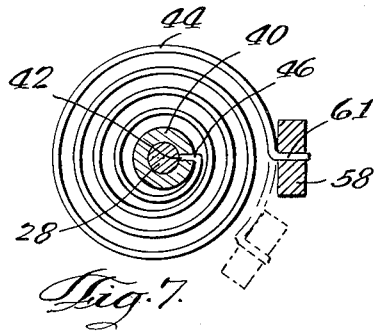
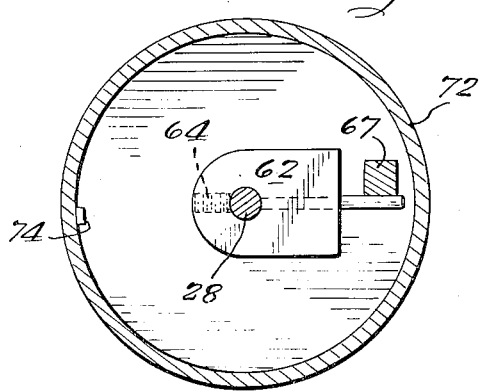
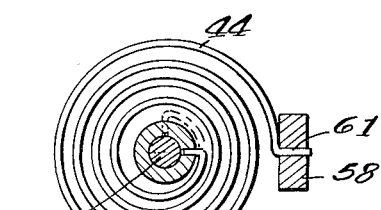

United States Patent Office 3,057,194
Patented Oct. 9, 1962

3,057,194
TORQUE GAUGE
Robert A. Waters, Weston, and Robert W. Damon, West Concord, Mass., assignors to Waters Manufacturing, Inc., Wayland, Mass., a corporation of Massachusetts
Continuation of application Ser. No. 638,512, Feb. 6, 1957. This application Apr. 21, 1958, Ser. No. 731,572
11 Claims. (Cl. 73—139)

This invention relates to an improvement in gauges for the measurement of torque, and more specifically to a simple and compact accurate instrument for measuring torques of opposite rotational directions. The present application is a continuation of the application of the same inventors filed February 6, 1957, Serial No. 638,512, now abandoned.

Heretofore, torque gauges of simple and inexpensive construction have been capable of accurately measuring torques in only one rotational direction. In order to be equipped for making accurate measurements of both clockwise and counter-clockwise torques without resorting to fairly complex and expensive measuring equipment, it was heretofore necessary to have two torque gauges in each range of torques in which it was desired that measurements be made.

The present invention provides a simple and relatively inexpensive bidirectional torque gauge which may easily and conveniently be employed to measure torques in either a clockwise or counter-clockwise direction without the necessity of making any changes in the instrument of any kind, a dial indicator being provided which displays a calibrated deflection in one direction for torques which are clockwise, and a calibrated indication in the other direction for torques which are counter-clockwise. This result is accomplished without any sacrifice of accuracy in either direction as compared with a unidirectional device for the same range, and at a great diminution in cost and increase in convenience of use as compared with two unidirectional devices.

For understanding of the manner in which these advantages are attained by the device of the present invention, reference is made to the single embodiment thereof illustrated in the drawing, in which:

FIGURE 1 is a longitudinal sectional view of a torque gauge embodying the teachings of the invention;

FIGURE 2 is an end elevation of the device;

FIGURE 3 is a fragmentary sectional view taken along the line 3—3 of FIGURE 1;

FIGURE 4 is an enlarged fragmentary sectional view corresponding to a portion of FIGURE 1 but illustrating in section certain of the parts shown in elevation in FIGURE 1;

FIGURE 5 is a transverse sectional view taken along the line 5—5 of FIGURE 4;

FIGURE 6 is a transverse sectional view taken along the line 6—6 of FIGURE 4;

FIGURE 7 is a fragmentary view taken along the line 7—7 of FIGURE 4 illustrating the action of a spring constituting a portion of the device in response to a torque in one direction; and FIGURE 8 is a view similar to that of FIGURE 7, but illustrating the action of the spring in response to a torque in the opposite direction.

The embodiment of the invention illustrated consists of a housing assembly generally designated 10 and a shaft assembly generally designated 12. The housing assembly 10 comprises a cylindrical housing block 14 having a large central bore 16 and cup-shaped recesses 18 and 20 in the ends thereof. Mounted in the bore 16, by ball bearings 22 spaced by a spacer sleeve 24, is the enlarged end portion 26 of a shaft 28 constituting a portion of the shaft assembly 12.

To the outer end of the enlarged portion 26 of the shaft 28 is secured a dial 30. Overlying the dial 30 is a transparent window or crystal 32 having inscribed thereon a suitable line indicator 34, the window 32 being secured in the outer end of the recess 18 by a bezel gasket 36.

Mounted for free rotation about the shaft 28 by means of a ball bearing 38 is a collar 40 having a portion 41 of large diameter and a portion 43 of small diameter. The reduced diameter portion 43 is slotted at 42. A spiral ribbon torsion spring 44 surrounds the small portion or hub 43 of the collar 40, the inner end thereof being bent radially inwardly at 46 and seated in the slot 42. An actuator pin 48 extends radially from the collar 40, this assembly constituting a rotor freely rotatable on the shaft 28 and secured as described to the inner end of the spring 44.

Independently journalled on the shaft 28 by a ball bearing 50 is another collar 52 having a radial extension 54, to the end of which is secured by pins 56 a longitudinally extending plate 58 which is slotted at 60, the outer end of the spring 44, bent radially outwardly at 61, being seated in the slot 60. A further collar 62 is rigidly secured to the shaft 28 by a set screw 64 and has a pin extension 66 of which the end is in the rotational path of a tab 67 on the lower end of the plate 58.

To the end of the shaft 28 is secured by means of a set screw 68 a cup-shaped member 72 which is nested into the lip of the cup-shaped recess 20 in the housing block 14 to enclose the mechanisms described above. At the periphery of the enclosure thus formed, a pin or stop member 74 extends from the floor of the cup-shaped member 72 into the rotational path of the outer end of the actuator pin 48 on the collar 40. In similar fashion, a pin or stop member 76 extends from the housing block 14 into the rotational path of the pin 48. A further stop member 78 extends from the housing 14 into the rotational path of a tab 79 on the plate 58.

The pin 74 is sufficiently removed from the axis of rotation of the shaft 28 so that it is not in the rotational path of the plate 58 when the latter is rotated about the shaft. Similarly, the longitudinal placement of the actuator pin 48 is such that it clears the tab 79 on the plate 58. The stop members on the housing assembly and on the shaft assembly are in an angular relation such that the spring forces each rotor member into abutment against a pair of stop members, one on each assembly, in the absence of external torque, this relation being accomplished by proper adjustment of the rotational position of collar 62 in assembly.

Threaded on a boss 70 on the cup-shaped member 72 is a chuck 80 adapted to be secured to an element of a machine such as a small motor upon which torque measurements are to be made by means of the device.

The structure and arrangement of the parts having been described, the manner of operation of the illustrated device will readily be understood. For convenience of reference to stationary and moving parts, the operation will be described in connection with an application wherein the shaft is stationary and the housing rotated, as in the measurement of the torque necessary to start the shaft of a load. In the absence of any applied torque between the housing assembly and the shaft assembly, these assemblies are held in a neutral relative position by the spring 44, the force of which is at all times exerted in a direction to unwind the spring. The outer end of the spring 44 holds the tabs on the plate 58 in abutment against both the stop 78 on the housing 14 and the stop 66 on the rotatable shaft assembly. The inner end of the spring 44 holds the pin 48 against the stops 74 and 76 on the respective assemblies. When the housing 14 is moved clockwise with respect to the shaft assembly (considering the direction of rotation as viewed in FIGURE 2), the stop 76 drives the pin 48, and thus the collar 40 and the inner end of the spring 44, in the clockwise direction (counter-clockwise in the view of FIGURE 8), the plate 58 and the outer end of the spring 44 remaining fixed in position because of the abutment of the plate 58 against the pin 66. Thus for this motion, the inner end of the spring is coupled to the housing and the outer end to the shaft. Because the pin 48 does not strike the plate 58, the limit of this clockwise motion is set only by the ultimate abutment of the pin 48 against the stop 74 after a degree of rotation well in excess of a half turn, but less than a full turn, this limit protecting against damage to the spring by the application of excessive torques.

If the housing 14 be turned counter-clockwise (clockwise in FIGURE 7) from the neutral position, the collar 40 and the inner end of the spring 44 remain stationary because of the abutment of the pin 48 against the stop 74. However, the plate 58 is driven counter-clockwise (clockwise in FIGURE 7) by the stop 78 and may reach a degree of rotation as described above, rotation in this direction being limited, for protection against damage by excessive torques, only by abutment of the tab 67 on the plate 58 against the pin 66. Thus for this motion the outer end of the spring is coupled to the housing and the inner end to the shaft.

It will thus be seen that the net effect on the spring 44 of a torque of any given magnitude is the same irrespective of the direction of the torque, the ultimate stressed condition of the spring being the same in either case, the only difference between the condition of the spring created by a clockwise torque and that created by a counter-clockwise torque being an overall angular displacement of the spring. As observed in the drawing, the scale or dial 30 is separately calibrated in both directions from the neutral position, so that the torque exerted between the housing assembly 10 and the shaft assembly 12 in either rotational direction may readily be read from the gauge. The abutment means which limit relative rotation in each direction from the neutral position to a zone extending more than a half turn and less than a full turn from the neutral position are each effective only during relative rotation in such direction, being activated and inactivated as the relative position passes through the neutral point; by this feature of construction, simple direct calibration of the relative positions in each direction is enabled without the necessity of limiting relative rotation to a half turn, thus seriously impairing accuracy of reading, or of eliminating the motion limits which are required for protection of the spring. It may be seen that the device may easily be employed for the reading of torques under a number of conditions, either the housing assembly 10 or the shaft assembly 12 being stationary with the other rotated, both being rotated in opposite directions, or both being rotated in the same direction but at different angular velocities. The device is of particular utility as an accurate and compact device for measuring low starting and moving torques on a large variety of rotating mechanisms.

As required by the patent laws, there is illustrated in the drawing and described above a single embodiment of the invention, incorporating the features of inventive novelty. However, it will readily be understood by persons skilled in the art that the basic teachings of the invention may readily be applied to a variety of embodiments which may be far different both in appearance and in details of operation from the illustrated embodiment, but which nevertheless are mere adaptations of the fundamental novel principles of construction and operation of the illustrated device. Accordingly, the teachings of the invention shall not be deemed to be limited by the particular embodiment described, but shall be defined in terms of the appended claims.

What is claimed is:

1. A bidirectional torque indicator comprising a housing, a shaft assembly comprising a shaft extending through the housing and a chuck on the extending end of the shaft, independently journalled rotor members on the shaft and freely rotatable thereon, a spiral torsion spring surrounding the shaft and having its inner and outer ends secured to the rotors, a first pair of stop members on the housing and the shaft assembly, respectively, and a second pair of stop members on the housing and the shaft assembly, respectively, each pair of stop members being in the path of one of the rotors but free of the path of the other of the rotors, the stop members on the housing and on the shaft assembly being so angularly related that the spring forces each rotor member into abutment against one pair of stop members in the absence of external torque, and cooperating calibration markings on the housing and the shaft assembly to indicate the deflection of the shaft with respect to the housing in either direction upon the application of external torque.

2. A torque indicator comprising a housing assembly, a shaft assembly rotatable in the housing assembly, calibrated means on the shaft assembly and the housing assembly to indicate the relative positions thereof, first and second rotor members freely rotatable on the shaft, a spiral spring surrounding the shaft and having the respective ends thereof secured to the rotor members, stop members on both the housing assembly and the shaft assembly engaging both the rotor members to limit the relative motion of one of the rotor members in one rotational direction and of the other of the rotor members in the other rotational direction, each rotor member being engaged by stop members on both assemblies in a neutral position, so that rotation of either of the assemblies in either direction from the neutral position deflects the spring in the same direction.

3. The indicator of claim 2 wherein the entire rotational path of each of the rotor members is free of obstruction other than the stop members so limiting its motion in one direction from the neutral position, so that substantially a full relative revolution in either direction may be made.

4. A torque indicator comprising a pair of members, means for mounting a member of the pair for rotational motion with respect to the other member, a spiral torsion spring surrounding the axis of said rotational motion, means for limiting the clock-wise motion of one end of the spring with respect to one of the members, means for limiting the counter-clockwise motion of the other end of the spring with respect to the other of the members, means for coupling said one end of the spring to said other of the members for motion counter-clockwise of the first limiting means, means for coupling said other end of the spring to said one of the members for motion clockwise of the second limiting means, and means for indicating the relative positions of the members, whereby the spring is stressed in the same direction by relative motion of the members in either direction, the relative positions of the members producing an indication of the torque deflecting the spring.

5. In a torque indicator, a pair of members, means for mounting one of the members for rotational motion with respect to the other, a spring, means responsive to relative rotation of the members in one direction from a neutral point to couple one end of the spring to one of the members and the other end of the spring to the other of the members, and means responsive to relative rotation of the members in the other direction from the neutral point to couple said one end of the spring to said other of the members and the other end of the spring to said one of the members, whereby the spring is stressed in the same direction by relative rotation in either direction from the neutral point.

6. In a measuring device comprising two relatively movable members, a spring interconnecting the members, and means for indicating the deflection of the spring resulting from the application of an exterior force, the improved construction wherein there are provided means responsive to relative motion of the members in one direction from a neutral point to couple a first end of the spring to a first of the members and a second end of the spring to the second of the members, and means responsive to relative motion of the members in the other direction from the neutral point to couple said first end of the spring to said second of the members and the second end of the spring to said first of the members, whereby the spring is stressed in the same direction by relative motion in either direction from the neutral point.

7. A torque gauge comprising an assembly having a pair of members having a rotational connection therebetween, a spring, means coupling the ends of the spring to the members to stress the spring in response to relative motion between the members in either direction from a neutral position, a first pair of stop surfaces on the assembly adapted to limit relative rotation in one direction from the neutral position to an angle greater than a half turn but less than a full turn, a second pair of stop surfaces on the assembly adapted to limit relative rotation in the other direction from the neutral position to an angle greater than a half turn but less than a full turn, and means responsive to passage through the neutral position to activate the pair of stop members limiting relative rotation in the direction of passage and to inactivate the pair of stop members limiting relative rotation in the opposite direction.

8. In a bidirectional torque gauge comprising a pair of members, a rotary lost motion connection between the members, a spring urging the pair to a neutral relative rotary position substantially midway of the lost motion arc, and means for indicating the relative positions of the members, the improvement wherein the connection has a lost motion arc of greater than one turn, but less than two turns, the respective members having affixed thereon cooperating means for producing an indication of the relative position extending on one of the members more than a half turn but less than a full turn in each direction from said neutral position.

9. The bidirectional torque gauge of claim 8 wherein one of the members has thereon a chuck at one end and a bidirectionally calibrated dial at the other end, the other member having a portion surrounding said dial adapted to be grasped in the hand and having a marker registering with the dial to indicate the position.

10. The bidirectional torque gauge of claim 9 wherein said other member has a transparent crystal overlying the dial, the marker being inscribed on the crystal.

11. The bidirectional torque gauge of claim 8 wherein the lost motion connection includes a third member mounted for motion with respect to both of the aforesaid members and including a stop surface limiting the motion in at least one direction.

References Cited in the file of this patent

UNITED STATES PATENTS

| | | |
|---|---|---|
| 2,225,420 | Mandl | Dec. 17, 1940 |
| 2,400,978 | Collins | May 28, 1946 |
| 2,830,450 | Knudsen | Apr. 15, 1958 |
| 2,977,801 | Dean | Apr. 4, 1961 |